(12) United States Patent
Björklund et al.

(10) Patent No.: US 11,468,795 B2
(45) Date of Patent: Oct. 11, 2022

(54) MODEL ARM ASSEMBLY FOR VEHICLE CRASH TEST DUMMIES

(71) Applicant: Volvo Car Corporation, Gothenburg (SE)

(72) Inventors: Magnus Vilhelm Björklund, Gothenburg (SE); Robert Joakim Risberg, Stenungsund (SE)

(73) Assignee: Volvo Car Corporation, Gothenburg (SE)

( * ) Notice: Subject to any disclaimer, the term of this patent is extended or adjusted under 35 U.S.C. 154(b) by 244 days.

(21) Appl. No.: 16/991,832

(22) Filed: Aug. 12, 2020

(65) Prior Publication Data

US 2021/0104179 A1 Apr. 8, 2021

Related U.S. Application Data

(60) Provisional application No. 62/912,504, filed on Oct. 8, 2019.

(51) Int. Cl.
*G09B 23/32* (2006.01)
*G01L 1/22* (2006.01)
*G01M 17/007* (2006.01)

(52) U.S. Cl.
CPC ............ *G09B 23/32* (2013.01); *G01L 1/2287* (2013.01); *G01M 17/0078* (2013.01)

(58) Field of Classification Search
CPC ... G01M 17/0078; G01L 1/2287; G09B 23/32
USPC ......................................................... 73/866.4
See application file for complete search history.

(56) References Cited

U.S. PATENT DOCUMENTS

| | | | | | |
|---|---|---|---|---|---|
| 4,349,339 | A | * | 9/1982 | Daniel | G09B 23/32 434/274 |
| 4,488,433 | A | * | 12/1984 | Denton | G09B 23/32 434/274 |
| 5,018,977 | A | * | 5/1991 | Wiley | G01M 17/0078 434/262 |
| 6,606,569 | B1 | * | 8/2003 | Potts | G01M 17/022 702/41 |
| 2021/0104179 | A1 | * | 4/2021 | Björklund | G01M 17/0078 |

* cited by examiner

*Primary Examiner* — Nathaniel T Woodward
(74) *Attorney, Agent, or Firm* — Shumaker & Sieffert, P.A.

(57) ABSTRACT

The disclosure describes an arm assembly for a crash test dummy. The arm assembly includes a model forearm, a model hand, and a model wrist joint coupling the model forearm and model hand. The model wrist joint includes at least one sensor configured to generate sensor data indicative of a force or a moment experienced by the model wrist joint.

20 Claims, 8 Drawing Sheets

MODEL ARM ASSEMBLY FOR VEHICLE CRASH TEST DUMMIES

This application claims the benefit of U.S. Provisional Application No. 62/912,504, filed Oct. 8, 2019, the entire contents of which is hereby incorporated by reference.

TECHNICAL FIELD

This disclosure relates to anthropomorphic test devices for assessing safety of vehicle occupants during collisions.

BACKGROUND

Vehicle manufacturers and governmental agencies utilize anthropomorphic test devices, commonly called crash test dummies, to assess the safety of vehicle occupants during vehicle collisions. The crash test dummies simulate the dimensions, weight proportions, and articulation of humans of various ages, sizes, and genders. Crash test dummies are instrumented with numerous sensors to measure movement of the dummy and forces on the dummy to better understand the effect of a vehicle collision on occupants of the vehicle.

SUMMARY

In general, the disclosed subject matter relates to measuring forces experienced by a model arm assembly during test collisions. The measured forces can be used for various purposes, such as to better understand the effect of a vehicle collision on occupants of the vehicle to potentially improve the safety of vehicle occupants during real world collisions. The model arm assembly includes a model forearm and a model hand mechanically coupled to one another via a model wrist. A vehicle manufacturer or other entity may perform test collisions that include the model arm assembly. As one example, the model arm assembly may be coupled to a crash test dummy. The crash test dummy may be placed inside a full scale crash vehicle, which is then collided with another object, or inside a partial vehicle body (also referred to as a body-in-white), which is then accelerated in a sled to produce a crash pulse similar to the crash pulse of a real accident. In another example, the model arm assembly is coupled to an ejector which may thrust the model arm assembly at a fixed object to simulate a vehicle collision.

The model wrist includes one or more sensors that are configured to generate sensor data indicative of forces experienced by the model wrist during the test collision. Examples of sensors configured to generate sensor data indicative of force include accelerometers, strain gauges, and/or force sensors. A computing device determines the forces, moments, and/or accelerations experienced by the model wrist during the test collision based on the sensor data generated by the sensors during the test collision. A vehicle manufacturer may analyze the test collisions and forces, moments, and/or accelerations experienced by the model wrist to make modifications to vehicles produced by the vehicle manufacturer.

When employed in a vehicle development process, the model arm assembly allows the vehicle manufacturer to evaluate improved injuries to a wrist and distal part of the ulnar and radius (e.g., forearm). Compared to other arm assemblies, the vehicle development process may focus on gaining better insights into a human arm's possible interactions with a vehicle component (e.g., an instrument panel) that is a common impact area in real world crashes. In addition to evaluating impacts (e.g., frontal impacts) with vehicle interior components, the vehicle manufacturer may use the model arm assembly to identify factors to mitigate hand/forearm injuries. In this manner, the vehicle manufacturer may test vehicle interior components with different properties to see which vehicle interior components enhance safety and to what extent.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
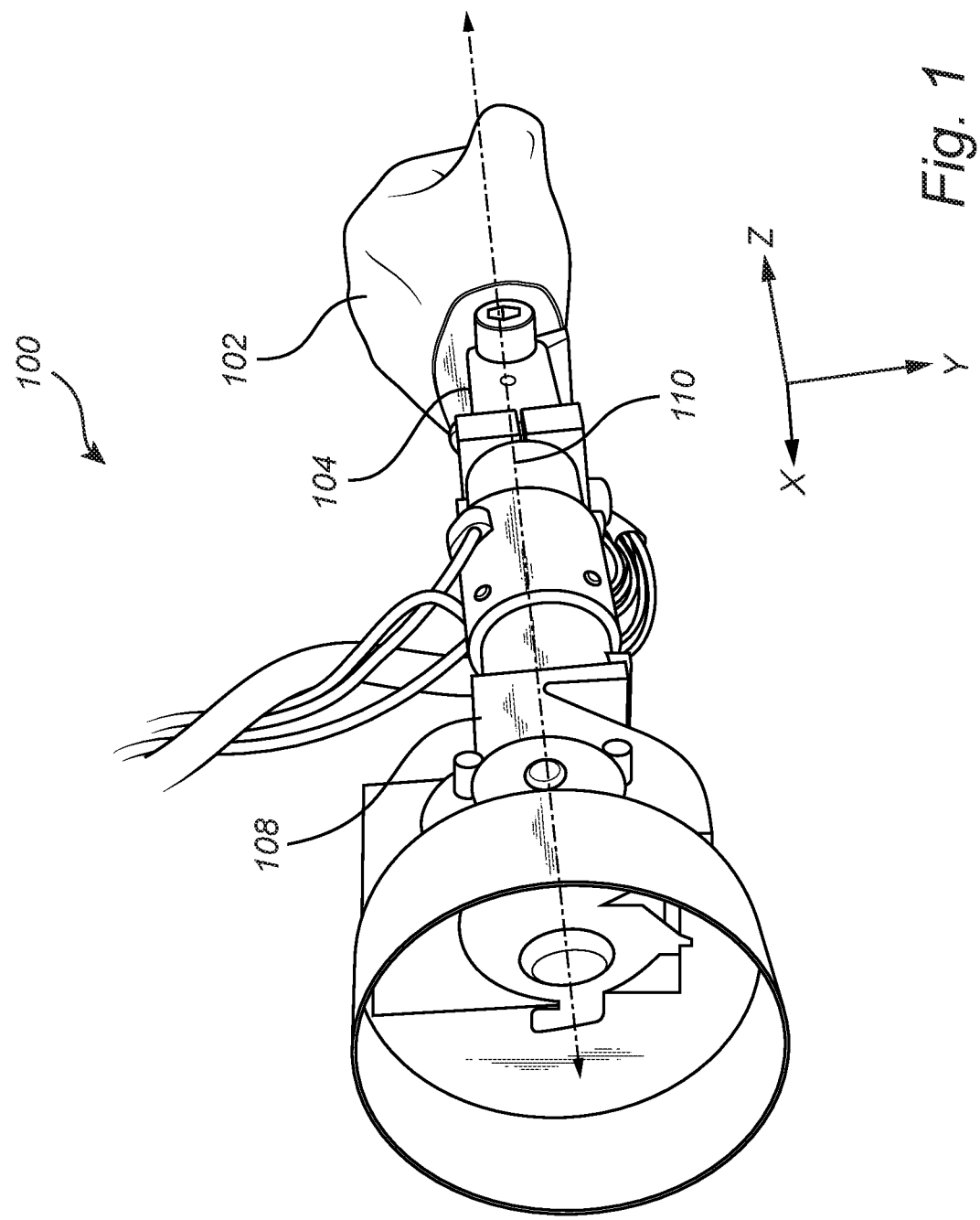
FIG. 1 is a side view of an example arm assembly for a crash test dummy, in accordance with one or more aspects of the present disclosure.

FIG. 1 is a side view of an arm assembly 100 for a crash test dummy, in accordance with one or more aspects of the present disclosure. In one example, the crash test dummy is manufactured to be a type of $50^{th}$ percentile dummy. Arm assembly 100 may be configured to simulate the dimensions, weight proportions, and/or articulation of the hand, wrist, and forearm of a human. Arm assembly 100 includes a model hand 102, model wrist joint 104, and model forearm 106 (shown in FIG. 2). In the example of FIG. 1, model hand 102 is mechanically coupled to model forearm 106 via model wrist joint 104.

In one example, model hand 102 includes a shell configured to simulate the shape and dimensions of a human hand. The shell may include a plastic, vinyl, or other material. In some examples, model hand 102 includes a palm and a plurality of digits, also referred to as fingers. The digits may be fixedly attached to the palm. In some examples, the digits may be coupled to the palm via one or more joints. In some examples, the digits include one or more joints that enable the digits to flex or bend similar to the movement of a human digit. In one example, model hand 102 may be approximately 0.57 kg and approximately 190 mm from the tip of the middle finger to the base of the palm (e.g., when model hand 102 is out-stretched).

Model forearm 106 includes shell configured to simulate the shape and dimensions of a human forearm. In some examples, the shell is generally tubular. The shell of model forearm 106 may include a plastic, vinyl, or other material. In one example, model forearm 106 includes shaft 111 (shown in FIG. 2) defines a longitudinal axis 110 of arm assembly 100. Longitudinal axis 110 may define an x-axis. Orthogonal x-y-z axes are shown in the figures for ease of description. Shaft 111 may be configured to support shell and provide a stiffness in the direction of longitudinal axis 110. Shaft 111 may include a metal (e.g., steel), plastic, or other rigid material. In one example, model forearm 106 may be approximately 300 mm in length along longitudinal axis 110 and approximately 1.7 kg.

Model wrist joint 104 is configured to mechanically couple model hand 102 to model forearm 106 to enable model hand 102 to flex in the palmar flexion and dorsiflexion directions. In some examples, model wrist joint 104 is configured to prohibit model hand 102 to fully rotate (e.g., 360 degrees) about shaft 111. Additional details of model wrist joint 104 are described below.

Model forearm 106 may be instrumented with three or more sensors configured to capture sensor data in terms of force(s), acceleration(s), and/or moment(s) (e.g., bending moment(s)) experienced by model wrist joint 104 and/or model forearm 106. A six-axis force transducer may capture force measurements while positioned in model wrist joint 104, for example, in a middle section of a metal component (e.g., a steel bar) representing long bones known as ulna and radius. A three-axis accelerometer may capture acceleration measurements while positioned in model forearm 106, for example, in a forearm section adjacent to model wrist joint 104. A plurality of strain gauges may capture moment measurements while in a bridge configuration, for example, a full-bridge configuration or a bending bridge configuration. Example sensor data output from the plurality of strain gauges may describe a bending moment at the metal component representing the wrist joint bones. An example of the metal component may be a fork-like steel bar representing the long bones ulna and radius. The six-axis force transducer, the three-axis accelerometer, and the plurality of strain gauges may be first, second, and third sensors, respectively, that, when combined (e.g., in arm assembly 100) to capture the above-mentioned sensor data, may determine a sensitivity experienced by the model wrist joint. The combination of at least these three sensors facilitates the determination of model wrist joint sensitivity at a high degree of precision. Regardless of which parameter value(s) define sensitivity in general, example sensitivity may represent at least the model wrist joint's capacity to tolerate an impact collision. Therefore, model wrist joint sensitivity may be used to model human wrist joint sensitivity in various circumstances.

As one example benefit to learning the model wrist joint's sensitivity, that value or set of values may determine a safety rating of a vehicle or a vehicle component. The model wrist joint's sensitivity may also be used for selecting vehicle components that improve vehicle safety. Having such information allows manufacturers to design and build safer vehicles and consumers to purchaser safer vehicles. Manufacturers in particular engage in various testing techniques to ensure vehicle safety for a number of reasons. These techniques are enhanced by employing arm assembly 100 (e.g., in impact collisions); one example testing technique facilitates differentiation between vehicles and vehicle components with respect to safety. The above-mentioned three or more sensors in arm assembly 100 enable precise model wrist joint sensitivity such that differences between vehicles with respect to impact collisions are easily identified. A metric can be built that measures an expected model wrist joint sensitivity given a set of impact crash parameters; some parameters correspond to vehicle design and thus, that metric is desirable for optimizing vehicle safety.

It is noted that other components of arm assembly 100 may include the same above-mentioned three or more sensors to capture sensor data for at least one other component; for example, an alternative embodiment of arm assembly 100 may instrument model hand 102 with at least a first sensor (e.g., an accelerometer), a second sensor (e.g., a force transducer), and a third sensor (e.g., a moment sensor). In addition to model wrist joint 104, arm assembly 100 may include (as an option) additional sensors in other arm assembly components.

In one example arm assembly 100, the plurality of strain gauges as a combination form a moment sensor configured to measure a bending moment at the metal component within model wrist joint 104. Model wrist joint 104 may include a plurality of beams extending out of model forearm 106 when the plurality of strain gauges are arranged in a full-bridge configuration including a first pair of strain gauges disposed on a top side of the plurality of beams and a second pair of strain gauges disposed on a bottom side of the plurality of beams. Each beam of the plurality of beams may define at least one recess, and each strain gauge of the plurality of strain gauges may be disposed within a respective recess of the at least one recess. The three-axis accelerometer may be coupled a respective beam of the plurality of beams. In some examples, model wrist joint 104 is modified to implement the plurality of strain gauges in a bending bridge configuration. Example modifications involve grinding out areas of model wrist joint 104 to ensure high sensitivity and low crosstalk effect (e.g., influence from other force directions on the output).

In some examples, arm assembly 100 includes an adapter 108 configured to couple model forearm 106 to an ejector (also referred to as a launcher). Example ejectors include pneumatic, hydraulic, and electro-magnetic propelled ejectors. Adapter 108 may include a plastic, metal, or other material. Adapter 108 may be attached to the ejector and held in place by a vacuum pump when used for testing arm assembly 100 (e.g., without being attached to the crash test dummy). In this configuration, arm assembly 100 provides a number of benefits to vehicle development processes, for example, by enabling a wide flexibility in impact angle and/or velocity for testing as well as little or no latency between tests. In addition, combining various sensors as described herein provides enhanced insight into force(s), accelerations(s), and/or moments experienced by human arms upon a vehicle's impact with an object. Hence, the design and instrumentation of arm assembly 100 allows for use in a considerable variety of impact situations including full-scale crash testing when mounted on a crash test dummy.

When testing arm assembly 100 (e.g., without being attached to the crash test dummy), arm assembly 100 may be placed in a straight position and propelled along a direction of the ejector. Respective measurements corresponding to impacts in flexion and extension hand trajectory and/or orientation are captured and used to improve vehicle safety. One purpose of testing arm assembly 100 is to provide insight into arm assembly 100's sensitivity in a vehicle-like interior impact situation as a complement to impacts to a generic flat test board and to evaluate factors influencing surface characteristics and impact load cases, providing input on kinetic responses targeting potential mitigation of injuries to model forearm 106.

A computing device (not pictured) operative for running tests on arm assembly 100 captures data corresponding to an axial force experienced by model forearm 106 and a moment experienced by model wrist joint 104 pursuant to at least one example test. Model wrist joint 104 may be a hinge joint between model forearm 106 and model hand 102, and that hinge joint may be modified to enable a more constant tightening force using two spring washers on either side of a hinge joint hole. Without the spring washers, the tightening force becomes stochastic (e.g., further tightened in one test configuration and loosened in another, affecting the outcome and making the result deviate substantially). Model wrist joint 104 may have a range of motion of approximately 95° flexion and 70° extension. A neutral position has been defined as a straight line through an elbow joint, model wrist joint 104, and between a thumb and a pointer of model hand 102. A model wrist joint 104 screw may be tightened with a torque of 3 Nm. In the example test, model wrist joint 104 includes four strain gauges with two on upper side and two on lower side. It is noted that other configurations are possible for model wrist joint 104.

Figure 2:
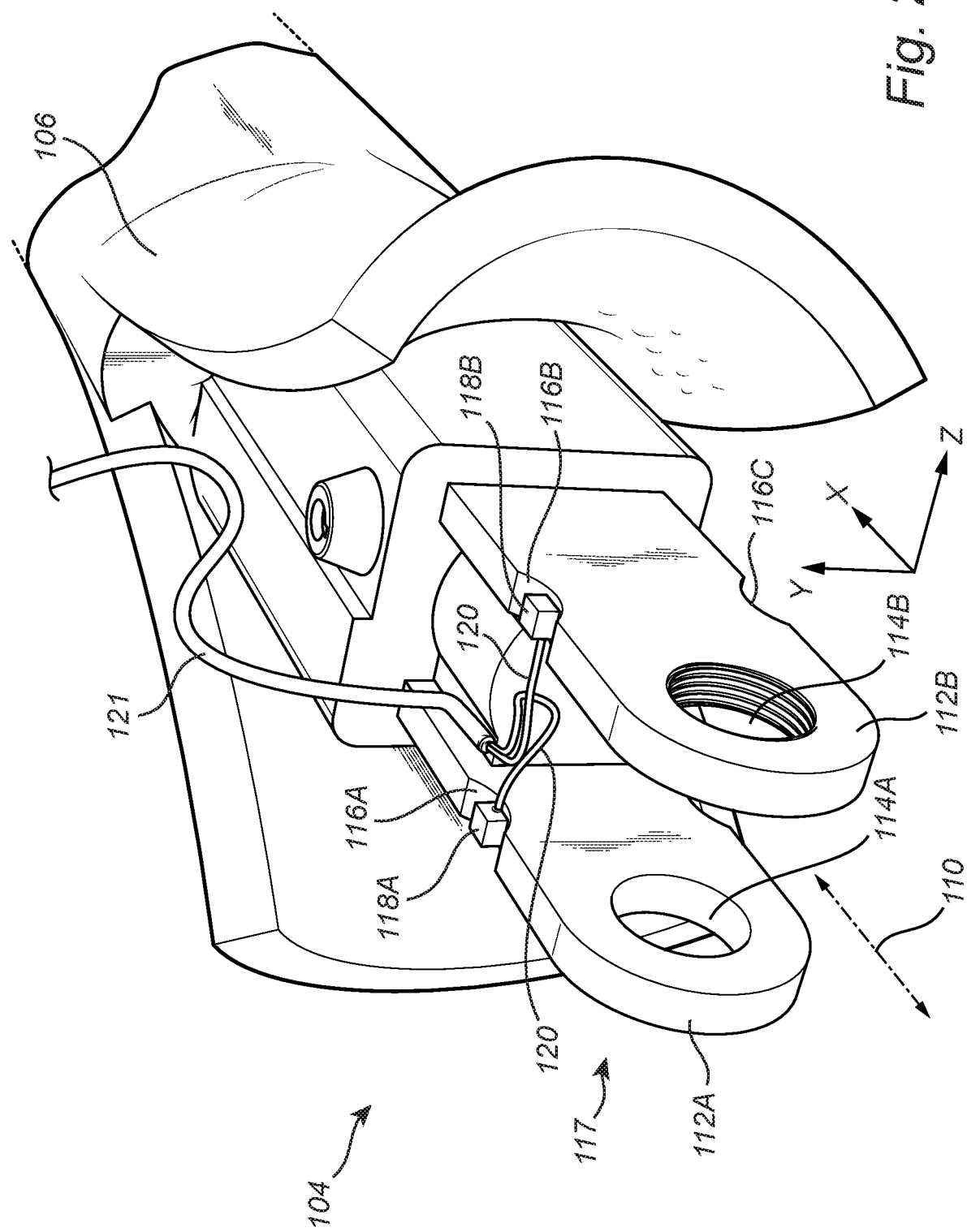
FIG. 2 is a perspective view of an example model wrist joint of the arm assembly of FIG. 1, in accordance with one or more aspects of the present disclosure.
Figure 3:
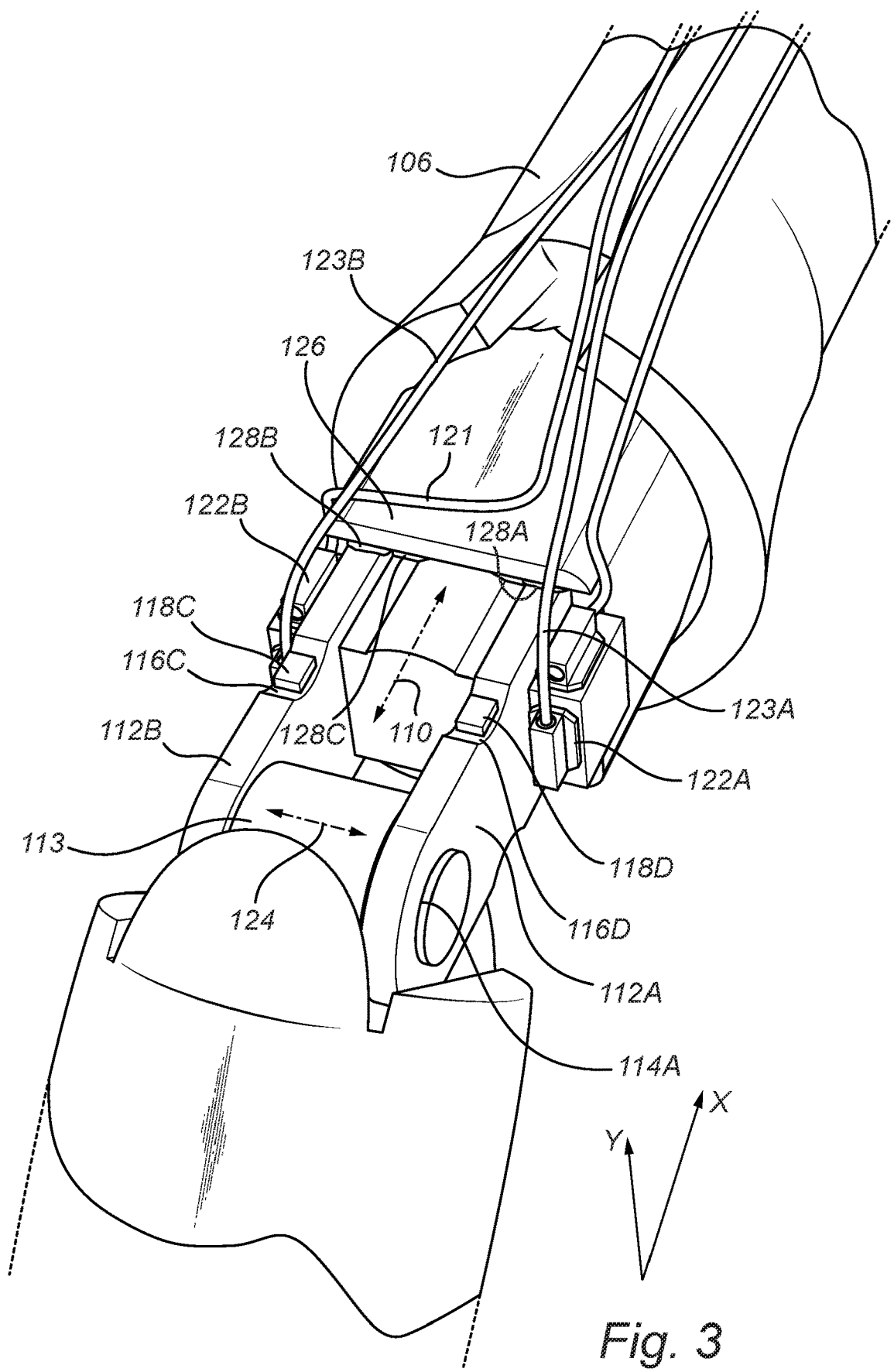
FIG. 3 is a perspective view of the example model wrist joint of FIG. 2, in accordance with one or more aspects of the present disclosure.

FIGS. 2 and 3 are perspective views of a model wrist joint 104 of the arm assembly of FIG. 1, in accordance with one or more aspects of the present disclosure. Model wrist joint 104 may be configured to represent the mechanical action of a human wrist. In some examples, model wrist joint 104 includes a plurality of beams 112A and 112B (collectively, beams 112) that are configured to physically couple model forearm 106 and model hand 102. In one example, beams 112 extend from model forearm 106 in the direction of longitudinal axis 110. Beams 112 may be a rigid beam and may include a metal (e.g., steel), plastic, or any other rigid material.

Beams 112A and 112B include apertures 114A and 114B (collectively, apertures 114), respectively, that are configured to receive a pin to physically couple model hand 102 to model forearm 106. In the example of FIGS. 2 and 3, beam 112A defines recesses 116A and 116B and beam 112B defines recesses 116C and 116D. In some examples, recesses 116-116C (collectively, recesses 116) are configured to house or retain one or more sensors. Recesses 116 may be, in some instances, approximately 3 mm in length in the direction defined by longitudinal axis 110. However, it should be recognized that recesses 116 may have any suitable configuration e.g., may be longer or shorter.

Model hand 102 is configured to flex relative to beam 113 in at least one direction when model hand 102 is mechanically coupled to model wrist joint 104. This flexibility may be achieved using any suitable technique. In one example, model wrist joint 104 includes beam 113 extending from model hand 102. Beam 113 may include a metal, plastic, or other relatively rigid material. Beam 113 is configured to engage with beams 112. For example, beam 113 may be configured to fit or slide between beams 112. Beam 113 defines an aperture. In some examples, model wrist joint 104 includes a pin inserted through apertures 114 of beams 112 and the aperture of beam 113. When the pin is inserted through the apertures, model hand 102 remains coupled to model forearm 106 while allowing the model hand to pivot about an axis 124 defined by the pin. In other words, the pin enables model hand 102 to flex in the palmar flexion and dorsiflexion directions.

In accordance with techniques of this disclosure, model wrist joint 104 includes at least one sensor configured to generate sensor data indicative of a force, an acceleration, and/or a moment experienced by the model wrist joint 104. Examples of sensors include a moment sensor (also referred to as a torque sensor), an accelerometer, a force sensor, a strain sensor, among other electrical devices (e.g., an amplifier and a logger). One sensor may be a combination of other sensors, for instance, an example moment sensor may be a plurality of strain gauges arranged in a (bending) bridge configuration. The example moment sensor may be configured to measure a bending moment during flexion of model wrist joint 104 and the bending moment may correspond to a moment experienced by a metal bar within model wrist joint 104. The example moment sensor may include a plurality of strain gauges arranged in either a full, half, or quarter bridge configuration having a first pair of strain gauges disposed on a top side of a plurality of beams extending out of model forearm 106 and a second pair of strain gauges disposed on a bottom side of the plurality of beams. The plurality of strain gauges may be arranged to be sensitive to a desired direction of forces/moments (e.g., minimizing crosstalk). A six-axis force transducer positioned in a middle section of a metal component of model wrist joint 104 may include one, two, or three moment sensors, each moment sensor being arranged in a full bridge configuration. By "full" or "half" bridge, the present disclosure refers to how the bridge is electrically configured, for example, with respect to a number of active resistances in a transducer. A full bridge has all four (4) resistances active, a half bridge only uses two (2) active resistances, and a quarter bridge uses only one active resistance. Any remaining electrical component having constant resistance are either placed in the amplifier or in the connector.

Sensor data indicative of the force, acceleration, and/or moment experienced by the model wrist joint 104 may include force data generated by a force sensor (also referred to as a force transducer), acceleration data generated by an accelerometer, moment data generated by a moment sensor or force transducer, or a combination thereof. In one example, model wrist joint 104 includes moment sensor 117 configured to generate an output indicative of a bending moment during extension (e.g., flexion such as palmar flexion or dorsiflexion) of model wrist joint 104. In some examples, moment sensor 117 may include a plurality of strain gauges 118A-118D (collectively, strain gauges 118). Strain gauges 118 are, in some examples, arranged in a full-bridge configuration. In one example, strain gauges 118 are arranged in a full-bridge configuration when a first pair of strain gauges 118A and 118B are disposed on one side (e.g., a top side) of beams 112 and a second pair of strain gauges 118C and 118D are disposed on an opposite side (e.g., a bottom side) of beams 112. Strain gauges 118 may be disposed into grooves on each side of beams 112 in order to significantly reduce cross-talk. Strain gauges 118 may generate sensor data indicative of the force(s) or the moment(s) experienced by model wrist joint 104 and output the sensor data via wires 120 (e.g., which may be bundled as wire 121). The sensor data may include moment data (also referred to as torque data), which may be divided by the length of the lever arm (e.g., the length of model hand 102) to determine the force experienced by model wrist joint 104. In such examples, the moment data may be indicative of moments and force experienced by model wrist joint 104.

In some examples, each of strain gauges 118 are disposed in a respective recess 116. Positioning strain gauges 118 within recesses 116 may increase the sensitivity of strain gauges 118 relative to strain gauges disposed on flat portion of beams 112.

As illustrated in FIG. 3, in some examples, model wrist joint 104 includes accelerometers 122A and 122B (collectively, accelerometers 122) configured to measure acceleration of model wrist joint 104. Accelerometers 122 may be coupled to a respective beam of beams 112. Accelerometers 122 measure acceleration in 1, 2, or 3 dimensions. While illustrated with two accelerometers 122, in some examples, model wrist joint 104 may include fewer or additional accelerometers 122. Accelerometers 122A and 122B may generate sensor data indicative of the force experienced by model wrist joint 104 and output the sensor data via wires 123A and 123B, respectively. For example, the sensor data may include acceleration data, which may be multiplied by the mass of arm assembly 100 to calculate the force experienced by model wrist joint 104. In such examples, the acceleration data may be indicative of acceleration and force experienced by model wrist joint 104.

In some scenarios, model wrist joint 104 includes mechanical stop 126 configured to restrain rotation of model hand 102 about shaft 111. In contrast to some examples that permit model hand 102 to fully rotate about longitudinal axis 110, in some examples, mechanical stop 126 is configured to regulate rotation of the model hand about an axis of the forearm to no more than a threshold rotation. For example, mechanical stop 126 may be physically coupled to shaft 111, which may restrain rotation of model hand 102 about longitudinal axis 110.

In some examples, model wrist joint 104 includes one or more dampeners 128A-128C (collectively, dampeners 128) configured to dampen a response of the at least one sensor. In one example, dampeners 128 include an elastic or viscoelastic material, such as a rubber tape. In an example where dampeners 128 include rubber tape, the thickness of the rubber tape may be approximately 2 mm (e.g., plus or minus 0.5 mm). Dampeners 128 may permit model hand 102 to rotate up to a threshold amount of rotation (e.g., 2, 3 degrees, 5 degrees, etc.) about longitudinal axis 110. In this way, mechanical stop 126 and dampeners 128 may permit a small amount of rotation of model hand 102 about longitudinal axis 110 that is consistent with the range of motion of a human hand relative to a forearm. In some examples, dampeners 128 are configured to have a particular stiffness, such as a stiffness within the range of stiffness typical of a human wrist.

Figure 4:
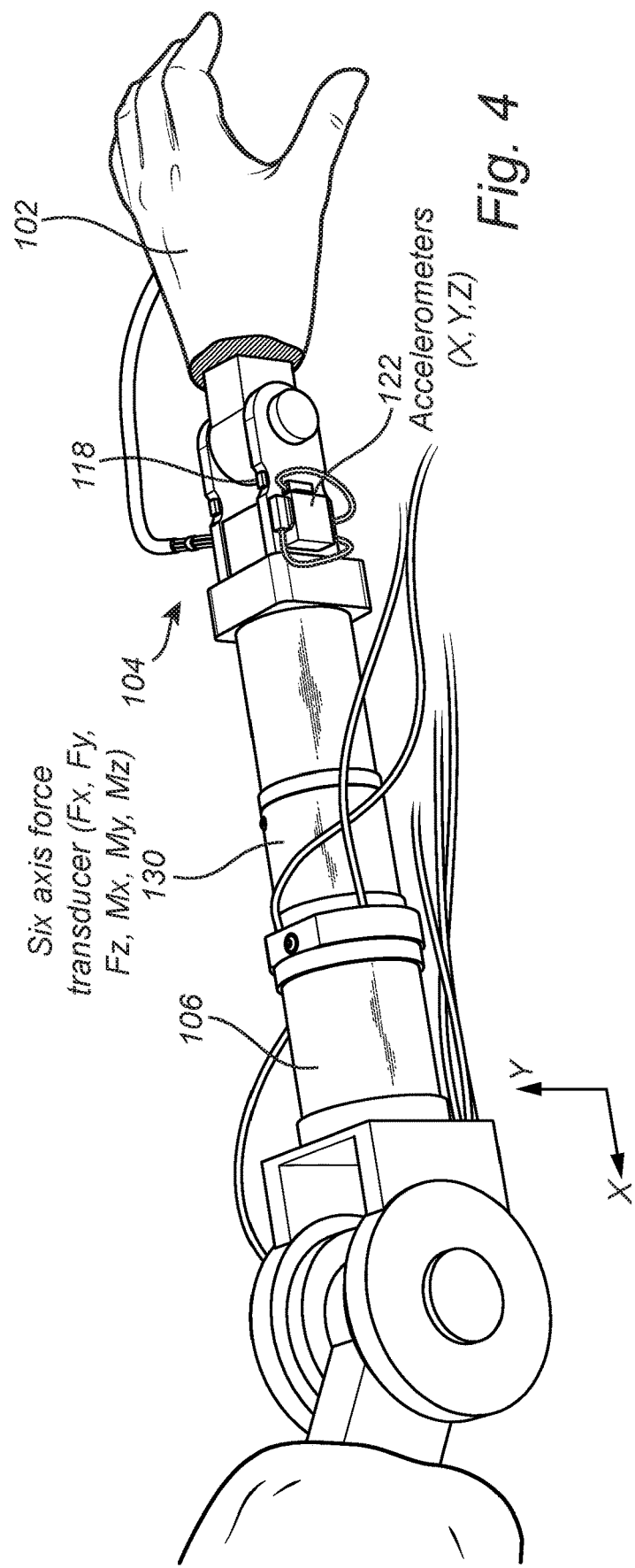
FIG. 4 is a perspective view of the arm assembly of FIG. 1, in accordance with one or more aspects of the present disclosure.

FIG. 4 is a perspective view of the arm assembly of FIG. 1, in accordance with one or more aspects of the present disclosure. In the example illustrated in FIG. 4, model forearm 106 includes a force transducer 130. Force transducer 130 may generate sensor data indicative of forces experienced by arm assembly 100. For example, force transducer 130 may be configured to measure force in one or more dimensions (e.g., 3-dimensions), moment (e.g., torque) in one or more dimensions (e.g., 3-dimensions), or both. In other words, force transducer 130 may measure force directly to generate force data indicative of the force experienced by arm assembly 100, and may measure moments directly to generate moment data indicative of moments experienced by arm assembly 100. In one example, the moment data is indicative of force experienced by arm assembly 100. For example, a computing device may determine the force experienced by arm assembly 100 by dividing the moment by the length of the lever arm.

Figure 5:
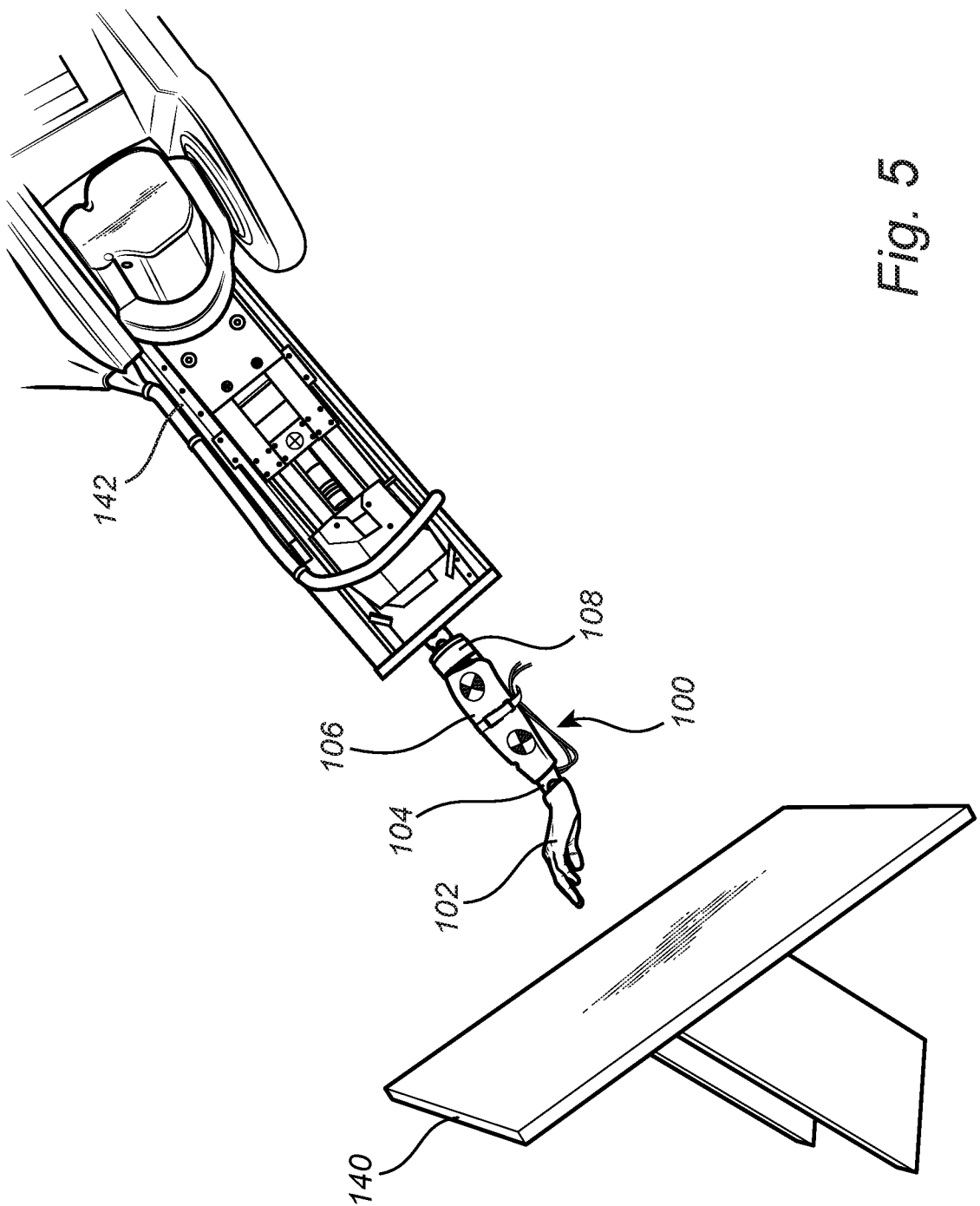
FIG. 5 illustrates the arm assembly of FIG. 1 coupled to an example ejector for use during test collisions, in accordance with one or more aspects of the present disclosure.

FIG. 5 illustrates the arm assembly 100 of FIG. 1 coupled to an ejector 142 for use during test collisions, in accordance with one or more aspects of the present disclosure. Arm assembly 100 may be coupled to ejector 142 via adapter 108.

Ejector 142 may perform test collisions to simulate the forces experienced by human hand during a vehicle collision. In one example, ejector 142 performs the test collision by accelerating or propelling arm assembly 100 towards an object 140. In some examples, object 140 represents a vehicle dashboard.

Figure 6:
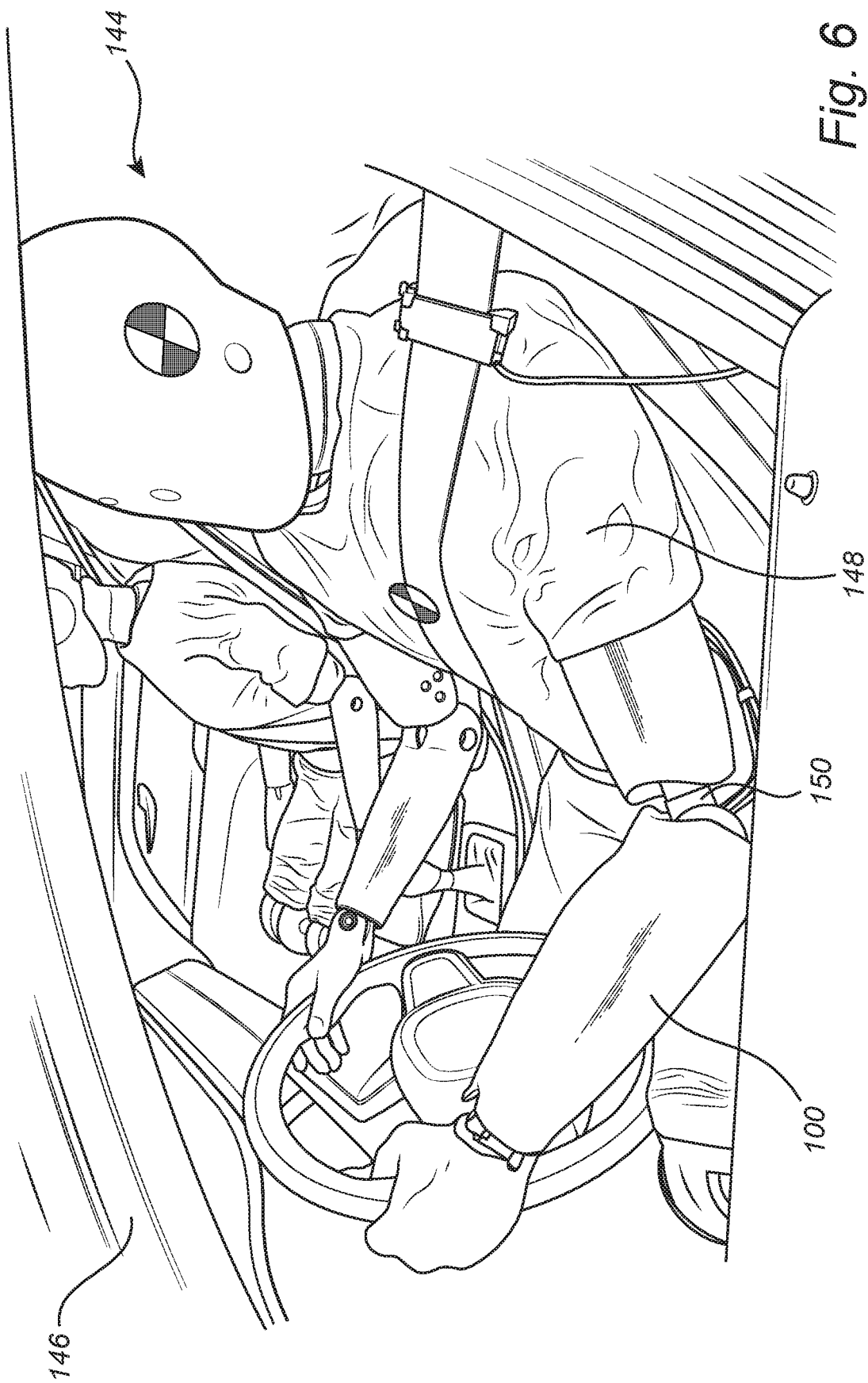
FIG. 6 illustrates the arm assembly of FIG. 1 coupled to an example crash test dummy for use during test collisions, in accordance with one or more aspects of the present disclosure.

FIG. 6 illustrates the arm assembly of FIG. 1 coupled to a crash test dummy for use during test collisions, in accordance with one or more aspects of the present disclosure. In one example, an end of model forearm 106 is configured to couple to a model upper arm 148 of a crash test dummy 144. Crash test dummy 144 may be disposed in a vehicle 146. In one example, crash test dummy 144 may be one of any type of $50^{th}$ percentile dummy or, in a different scale, a $5^{th}$ percentile or $95^{th}$ percentile dummy. Vehicle 146 may include a full crash scale vehicle or a partial vehicle body. An operator of vehicle 146 (e.g., a vehicle manufacturer, test lab, or government agency) may perform a test collision by propelling vehicle 146 towards an object or accelerating vehicle 146 in a sled to simulate forces experienced by humans during an actual vehicle collision.

Elbow joint 150, when mounted on crash test dummy 144, may limit the rotation of model forearm 106 to no more than a threshold lateral rotation (e.g., maximum sixty (60) degrees). For example, in instances where elbow joint 150 and model upper arm 148 of crash test dummy 144 is coupled to model forearm 106, elbow joint 150 is configured to prevent lateral rotation of model forearm 106 to be less than or equal to a threshold lateral rotation. To illustrate, an example crash test dummy 144 may be configured to have a range of rotation between model forearm 106 and model upper arm 148 (e.g., via elbow joint 150) be limited to 60 degrees and a shoulder joint of crash test dummy 144 may be manufactured to have a range of rotation limited to 30 degrees. In combination, the resulting in a total lateral rotation of both the shoulder joint and elbow joint 150 may be plus or minus ninety (90) degrees.

In the examples of FIGS. 5 and 6, one or more sensors of arm assembly 100 generate sensor data indicative of forces experienced by a portion of arm assembly 100 when arm assembly 100 collides with an object during a test collision. For instance, moment sensor 117 and/or accelerometers 122 may generate sensor data indicative of the force (e.g., acceleration data indicative of acceleration and/or moment data indicative of moments) experienced by model wrist joint 104 during the collision and output the sensor data to a computing device. In some instances, force transducer 130 generates sensor data indicative of the force (e.g., force data and moment data) experienced by model forearm 106 during the collision and output the sensor data to a computing device. In one example, the computing device receives moment data from moment sensor 117 and determines the force experienced by model wrist joint 104 by dividing the moment data by the length of the lever arm (e.g., the length of model hand 102). In another example, the computing device receives acceleration data from accelerometers 122 and determines the force experienced by model wrist joint 104 by multiplying the acceleration by the mass of arm assembly 100.

A vehicle manufacturer, government agency, or other entity may analyze the forces experienced by arm assembly 100 to assess the safety of a vehicle during a vehicle collision and/or make adjustments to a vehicle to improve safety of occupants during vehicle collisions. For example, the vehicle manufacturer may choose materials for interior components of the vehicle, adjust a shape and/or size of various interior components, add components (e.g., airbags), or a combination thereof, to potentially reduce forces and/or moments experienced by a human hand during vehicle collisions. In this way, instrumenting model wrist joint 104 of arm assembly 100 with various sensors may enable a vehicle manufacturer, government agency, or other entity to more accurately model forces experienced by a model arm assembly during test collisions. More accurately modeling forces during test collisions may enable such entities to better understand the forces experienced by humans during actual vehicle collisions and design vehicles to reduce such forces during the actual vehicle collisions, thereby potentially increasing safety of human occupants during actual vehicle collisions.

Figure 7:
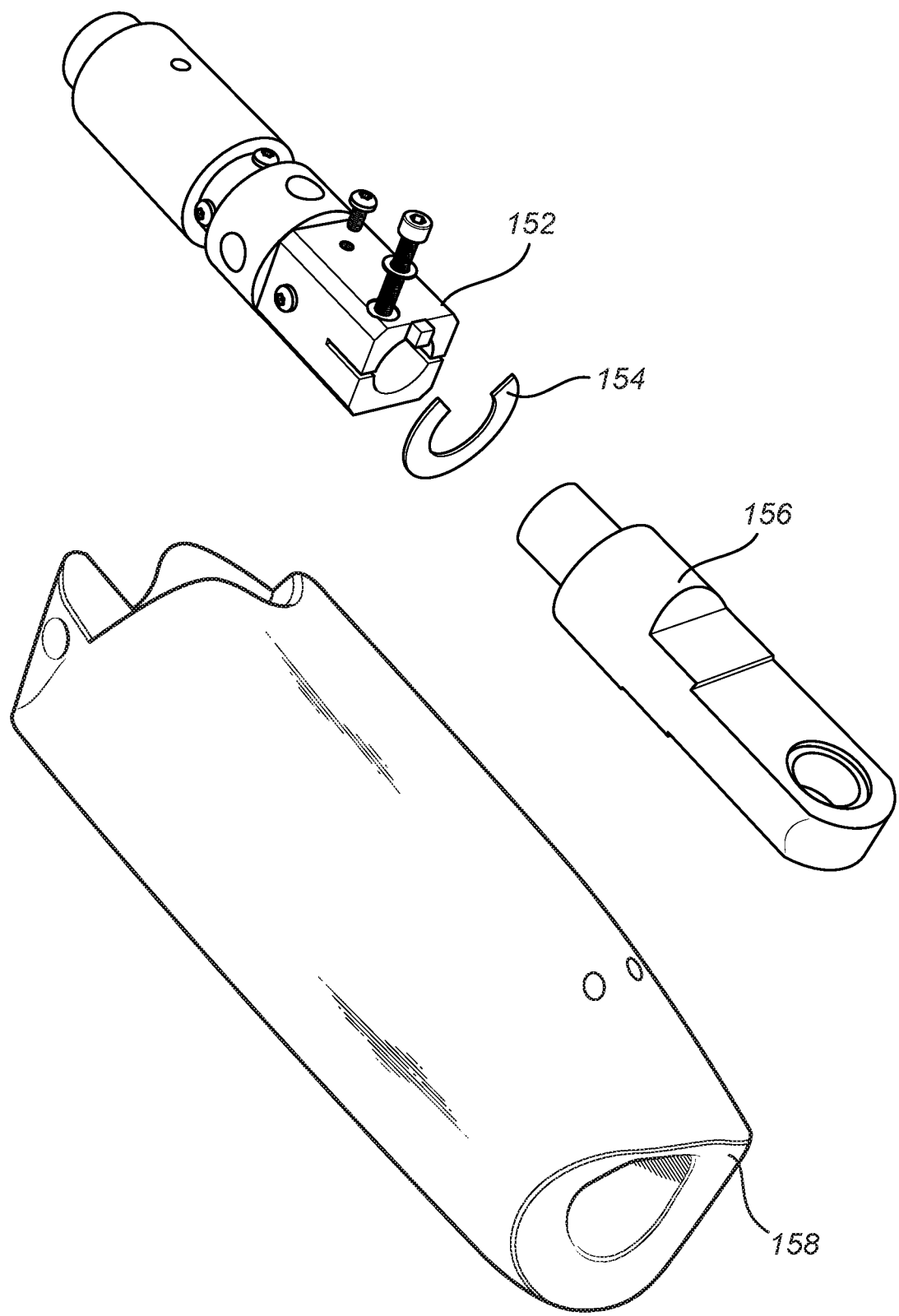
FIG. 7 illustrates components of the elbow joint of FIG. 6, in accordance with one or more aspects of the present disclosure.

FIG. 7 illustrates components of model upper arm 148 of FIG. 6, in accordance with one or more aspects of the present disclosure. Model upper arm 148 may include an example elbow joint such as elbow joint 150 as illustrated in FIG. 6. Various components of model upper arm 148 include load cell interface 152, mechanical stop component 154, and model upper arm lower unit 156 as illustrated in FIG. 7. These example components and other components of the elbow joint 150 are assembled into model upper arm 148 such that model upper arm lower unit 156 protrudes out from arm flesh 158. As described herein, these components engage each other when regulating rotation of model forearm 106 (and elbow joint 150) to no more than a threshold rotation of N (e.g., 60) degrees.

The mechanical stop component 154, while illustrated in FIG. 7 as unattached, is configured to couple with model upper arm lower unit 156 via another mechanical stop component to form a mechanical stop configured to regulate a rotation of model forearm 106 about an axis of model upper arm 148 to no more than a threshold rotation (e.g., threshold lateral rotation). In some examples, mechanical stop component 154 is installed into an operating position between load cell interface 152 and model upper arm lower unit 156. At this position, mechanical stop component 154 restrains model forearm 106 to plus/minus N (e.g., 60) degrees about its axis of rotation. In one example implementation of mechanical stop component 154, a mechanical stop ring engages with a mechanical stop block mounted on load cell interface 152 such that an axial rotation of model upper arm lower unit 156 is equal to a lateral rotation of 60 degrees achieved by model forearm 106. The mechanical stop ring (e.g., a washer) may include a slit where material has been removed and rubber ends for ends of the slit. A space formed between the rubber ends within which the mechanical stop block moves allows for the axial rotation of model upper arm lower unit 156. The mechanical stop block restricts the axial rotation of model upper arm lower unit 156 to this space by stopping the axial rotation when the mechanical stop block contacts one of rubber ends of the slit. A slit encompassing 60 degrees of the mechanical stop ring is used to restrict model forearm 106 to plus/minus 60 degrees about an axis (e.g., a vertical axis) of model upper arm 148 and elbow joint 150.

When mounted on crash test dummy 144, elbow joint 150 in combination with the shoulder joint of crash test dummy 144, are configured to restrict arm assembly 100 to a total lateral rotation of approximately 90 degrees. By restricting the lateral rotation to approximately 90 degrees, techniques of this disclosure provide crash test dummy 144 with a range of motion that is similar to human shoulder and wrist joints, which may provide more biomechanically relevant crash test strain data. Such data may enable vehicle and vehicle part designers to design new components and vehicles that may reduce injury risk to the occupant.

Figure 8:
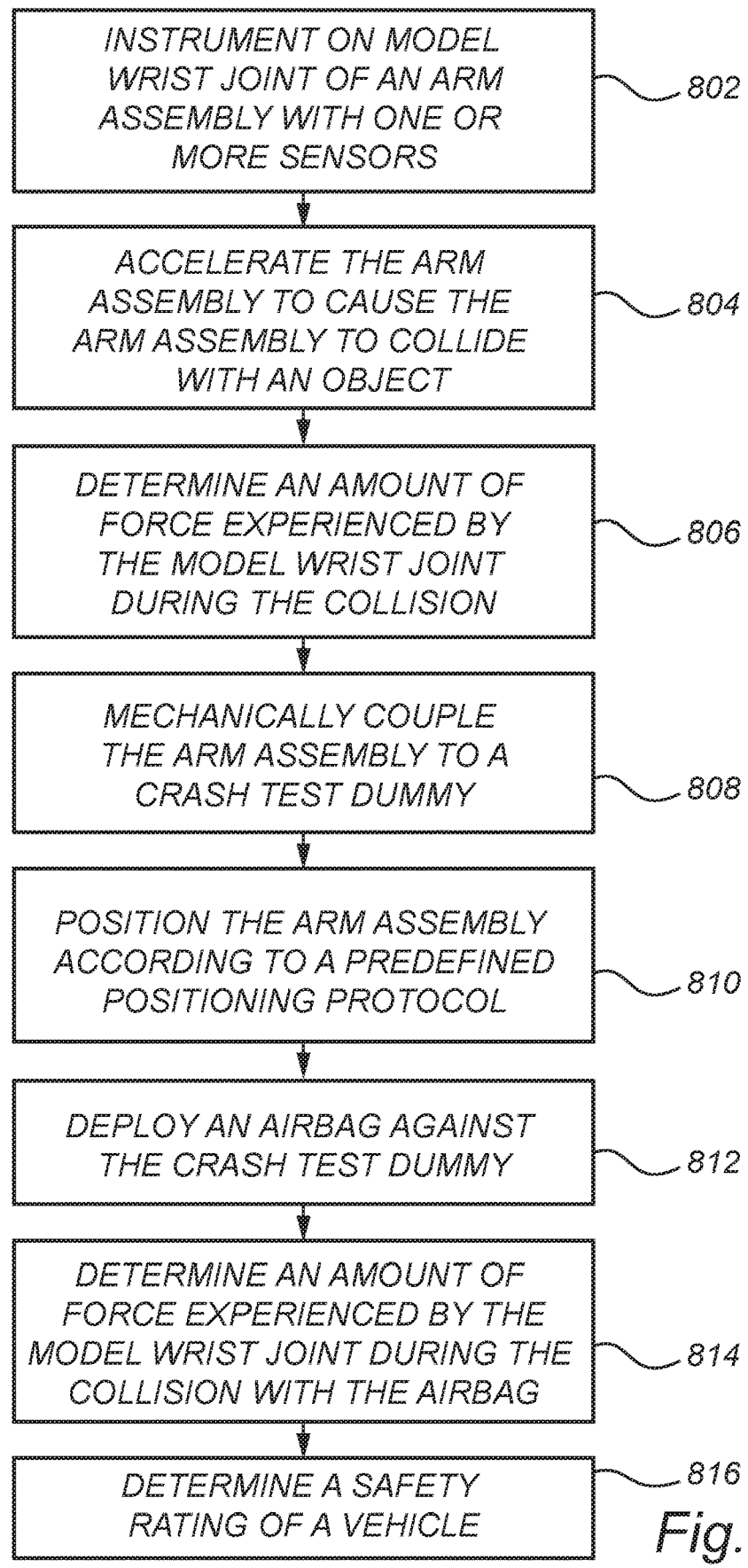
FIG. 8 is a flowchart illustrating example operations for performing test collisions involving the model wrist joint of FIGS. 2-3, in accordance with one or more aspects of the present disclosure.

FIG. 8 is a flowchart illustrating example operations for performing test collisions involving the model wrist joint of FIGS. 2-3, in accordance with one or more aspects of the present disclosure.

An entity (e.g., a vehicle manufacturer, crash test dummy manufacturer, government agency, etc.) may instrument model wrist joint 104 of arm assembly 100 with one or more sensors that are configured to generate sensor data indicative of forces experienced by the model wrist joint 104 during a test collision (802). The sensors may include one or more accelerometers, one or more strain gauges, or a combination thereof. In one example, instrumenting or outfitting model wrist joint 104 includes attaching an accelerometer to a beam 113 of model wrist joint 104. In another example, instrumenting model wrist joint 104 includes forming a plurality of recesses 116 in beams 113 and positioning a strain gauge in each respective recess.

In one example, arm assembly 100 is accelerated to cause arm assembly 100 to collide with an object (804). For example, model wrist joint 104 may be coupled to an ejector 142 (e.g., via adapter 108) and ejector 142 may propel arm assembly 100 towards an object. In some examples, the object includes a mock vehicle dashboard representative of the dashboard of a vehicle. The sensors of model wrist joint 104 may generate data indicative of forces experienced by model wrist joint 104 before, during, and/or after arm assembly 100 collides with the object.

A computing device may receive the sensor data and determine an amount of force experienced by model wrist joint 104 during the collision (806). For example, when the sensor data includes acceleration data, the computing device may multiply the acceleration by the mass of arm assembly 100 to calculate the force experienced by model wrist joint 104. In an example where the sensor data includes moment data, the computing device may divide the moment by the length of the lever arm (e.g., the length of model hand 102) to determine the force experienced by model wrist joint 104.

The entity may mechanically couple arm assembly 100 to a crash test dummy 144 (808). For example, arm assembly 100 may be coupled to a model upper arm 148 of crash test dummy 144 without the need for adapter 108.

In one example, the entity positions arm assembly 100 according to a pre-defined positioning protocol (810). The pre-defined positioning protocol may specify a plurality of different positions of arm assembly 100 (e.g., different positions for different test collisions, such as side impact collisions, front impact collisions, etc.).

The entity may statically deploy an airbag against crash test dummy 144 (812). For example, the entity may deploy the air bag against crash test dummy several different times with arm assembly 100 positioned in a different position for each test collision. The computing device may determine an amount of force experienced by model wrist joint 104 during each collision with the airbag (814), in a similar manner as described above.

Responsive to determining the forces experienced by model wrist joint 104 during the test collisions (e.g., test collisions involving a static deployment of the airbag and/or propulsion of arm assembly 100 via ejector 142), the computing device may determine a safety rating of a vehicle based on the forces (816). For example, the computing device may include data indicating a plurality of safety ratings and, for each safety rating, a range of forces associated with the safety rating. In one example, the computing device determines a safety rating associated with each collision (e.g., on a scale of 1 to 5). The computing device may determine an aggregate safety rating based on each of the individual safety rating, for example, by averaging the safety ratings.

Various examples have been described. Additional examples are described with respect to the attached Appendix, the content of which is incorporated by reference in its entirety. These and other examples are within the scope of the following claims.

What is claimed is:

1. An arm assembly for a crash test dummy comprising:
    a model forearm;
    a model hand; and
    a model wrist joint coupling the model forearm and the model hand, the model wrist joint including a plurality of sensors wherein at least one first sensor is configured to generate sensor data indicative of a force experienced by the model wrist joint, at least one second sensor is configured to generate sensor data indicative of an acceleration of the model wrist joint, and at least one third sensor is configured to generate sensor data indicative of a moment experienced by the model wrist joint.

2. The arm assembly of claim 1, wherein the at least one third sensor includes a moment sensor configured to measure a bending moment at a metal bar within the model wrist joint, wherein the moment sensor includes a plurality of strain gauges arranged in a bending bridge configuration.

3. The arm assembly of claim 1, wherein the at least one third sensor includes a moment sensor configured to measure a bending moment during flexion of the model wrist joint, wherein the model wrist joint comprises a plurality of beams extending out of the model forearm, wherein the moment sensor includes a plurality of strain gauges arranged in a full-bridge configuration including a first pair of strain gauges disposed on a top side of the plurality of beams and a second pair of strain gauges disposed on a bottom side of the plurality of beams.

4. The arm assembly of claim 3, wherein each beam of the plurality of beams defines at least one recess, and wherein each strain gauge of the plurality of strain gauges is disposed within a respective recess of the at least one recess.

5. The arm assembly of claim 1, wherein the at least one second sensor includes at least one accelerometer configured to measure an acceleration of the arm assembly, wherein the accelerometer is placed on the model forearm at a position adjacent to the model wrist joint.

6. The arm assembly of claim 5, wherein the model wrist joint comprises a plurality of beams extending out of the model forearm, and wherein the at least one accelerometer is coupled to a respective beam of the plurality of beams.

7. The arm assembly of claim 1, further comprising a mechanical stop configured to regulate rotation of the model hand about a longitudinal axis of the model forearm to no more than a threshold rotation.

8. The arm assembly of claim 7, wherein the mechanical stop is coupled to the model wrist joint via a dampener configured to dampen a response of the at least one sensor, wherein the dampener includes an elastic material or a visco-elastic material.

9. The arm assembly of claim 1, wherein the model forearm includes an elbow joint on which an adapter is mounted to enable at least one coupling in at least one position of the adapter.

10. The arm assembly of claim 1, wherein the model forearm includes a force transducer configured to measure forces and moments experienced by the model forearm, wherein the force transducer is attached to a metal component representing a bone.

11. The arm assembly of claim 1, wherein the model forearm is configured to couple to a model upper arm of a crash test dummy, wherein the model upper arm further comprises a mechanical stop configured to regulate rotation of the model forearm to no more than a threshold lateral rotation.

12. The arm assembly of claim 1, further comprising an adapter configured to couple the model forearm to a launcher configured to propel the model forearm towards an object.

13. The arm assembly of claim 1, wherein the model wrist joint comprises:
    a first beam extending from the model forearm and including a first aperture,
    a second beam extending from the model forearm and including a second aperture,
    a third beam extending from the model forearm and including a third aperture, the third beam configured to fit between the first and second beams,
    a pin configured to insert through the first, second, and third apertures to couple the model forearm and the model hand and permit the model hand to flex in a palmar flexion or dorsiflexion direction.

14. A method for simulating a collision of a vehicle, the method comprising:
    accelerating an arm assembly to cause the arm assembly to collide with an object, wherein the arm assembly is configured to couple with a crash test dummy comprises:
        a model forearm,
        a model hand, and
        a model wrist joint coupling the model forearm and the model hand, the model wrist joint including a plurality of sensors wherein at least one first sensor is configured to generate first sensor data indicative of a force experienced by the model wrist joint and at least one second sensor is configured to generate second sensor data indicative of an acceleration of the model wrist joint, and at least one third sensor is configured to generate third sensor data indicative of a bending moment experienced by the model wrist joint; and
    determining, based on at least one of the first sensor data, the second sensor data, or the third sensor data generated by the plurality of sensors, a sensitivity experienced by the model wrist joint.

15. The method of claim 14, further comprising:
    mechanically coupling the arm assembly to the crash test dummy;
    positioning the crash test dummy according to a pre-defined positioning protocol, the pre-defined positioning protocol specifying a plurality of different positions of the arm assembly;
    determining, based on the first sensor data generated by the at least one first sensor, a first force experienced by the model wrist joint at a time of collision;
    for each position of the plurality of different positions, statically deploying an airbag against the crash test dummy;
    determining, based on the second sensor data generated by the at least one second sensor, a second force experienced by the model wrist joint when the airbag deployed; and determining, based on the third sensor data generated by the at least one third sensor, a third force experienced by the model wrist joint in at least one of a trajectory or an orientation after the time of collision with the object.

16. The method of claim 15, wherein determining the third force further comprises:
determining, based on the third sensor data generated by the at least one third sensor, a moment experienced by the model wrist joint upon impact with vehicle interior.

17. The method of claim 15, wherein positioning the crash test dummy further comprises:
rotating the model hand about a longitudinal axis of the model forearm to no more than a threshold rotation.

18. The method of claim 15, wherein the model forearm of the arm assembly is coupled to a model upper arm and wherein positioning the crash test dummy further comprises:
rotating the model forearm about an axis of the model upper arm to no more than a threshold rotation.

19. The method of claim 15, further comprising:
determining a safety rating of the vehicle based on at least one of the first force or the second force.

20. A computing device communicably coupled to an arm assembly of a crash test dummy, the computing device comprising circuitry configured to execute logic that is operable to:
accelerate a vehicle to cause the arm assembly to collide with an object, wherein the arm assembly for the crash test dummy comprises:
a model forearm,
a model hand, and
a model wrist joint coupling the model forearm and the model hand, the model wrist joint including a plurality of sensors wherein at least one first sensor is configured to generate first sensor data indicative of a force experienced by the model wrist joint, at least one second sensor is configured to generate second sensor data indicative of an acceleration of the model wrist joint, and at least one third sensor is configured to generate third sensor data indicative of a bending moment; and
determine, based on the first sensor data generated by the at least one first sensor, a first force experienced by the model wrist joint.

* * * * *